(12) United States Patent
Raghavan et al.

(10) Patent No.: US 10,664,350 B2
(45) Date of Patent: May 26, 2020

(54) FAILURE HANDLING FOR LIFECYCLE BLUEPRINT WORKFLOWS

(71) Applicant: VMware, Inc., Palo Alto, CA (US)

(72) Inventors: Vijay Raghavan, Mountain View, CA (US); Kevin Xie, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 104 days.

(21) Appl. No.: 15/840,749

(22) Filed: Dec. 13, 2017

(65) Prior Publication Data

US 2018/0165158 A1 Jun. 14, 2018

Related U.S. Application Data

(60) Provisional application No. 62/433,820, filed on Dec. 14, 2016.

(51) Int. Cl.
| | | |
|---|---|---|
| *G06F 11/00* | (2006.01) | |
| *G06F 11/14* | (2006.01) | |
| *G06F 9/455* | (2018.01) | |
| *G06F 8/00* | (2018.01) | |
| *G06F 8/60* | (2018.01) | |
| *G06F 8/70* | (2018.01) | |

(52) U.S. Cl.
CPC .......... *G06F 11/1438* (2013.01); *G06F 8/00* (2013.01); *G06F 8/60* (2013.01); *G06F 8/70* (2013.01); *G06F 9/45533* (2013.01); *G06F 11/14* (2013.01); *G06F 11/1484* (2013.01); *G06F 2201/805* (2013.01); *G06F 2201/815* (2013.01)

(58) Field of Classification Search
CPC ..... H04L 41/12; H04L 41/145; H04L 41/147; G06F 8/60; G06F 8/70
See application file for complete search history.

(56) References Cited

U.S. PATENT DOCUMENTS

| | | | |
|---|---|---|---|
| 6,574,605 B1 * | 6/2003 | Sanders ......... | G06Q 10/063112 705/7.26 |
| 7,065,493 B1 * | 6/2006 | Homsi .................. | G06Q 10/06 705/7.26 |
| 7,805,327 B1 * | 9/2010 | Schulz ............. | G06Q 10/06316 705/7.26 |
| 8,001,429 B2 * | 8/2011 | Breiter ............... | G06Q 10/0633 714/48 |
| 9,047,133 B2 | 6/2015 | Winterfeldt et al. | |
| 9,052,961 B2 | 6/2015 | Mangtani et al. | |
| 9,170,798 B2 | 10/2015 | Nagaraja et al. | |
| 9,535,669 B2 | 1/2017 | Epstein et al. | |
| 10,061,613 B1 | 8/2018 | Brooker et al. | |

(Continued)

*Primary Examiner* — Bryce P Bonzo
*Assistant Examiner* — Jeison C Arcos

(57) ABSTRACT

An information-technology (IT) blueprint is an executable document that, when executed, can be used to create an IT application such as an e-commerce site. An IT lifecycle blueprint can further be used to manage (e.g., modify) and, ultimately, destroy such an IT application. To this end, an automation engine for the blueprint can include idempotent methods to generate workflows that achieve the same result whether starting from a blank (real or virtual) infrastructure or from a previously populated infrastructure. If a workflow task fails, the workflow that included the task can be re-executed; alternatively, a new workflow can be generated based in part on the application configuration following a fix for the failure.

11 Claims, 10 Drawing Sheets

(56) References Cited

U.S. PATENT DOCUMENTS

| | | | |
|---|---|---|---|
| 2002/0004933 A1 | 1/2002 | Dzoba et al. | |
| 2002/0163544 A1 | 11/2002 | Baker et al. | |
| 2004/0019512 A1* | 1/2004 | Nonaka | G06Q 10/06311 705/7.26 |
| 2004/0083448 A1* | 4/2004 | Schulz | G06Q 10/06 717/101 |
| 2006/0067252 A1* | 3/2006 | John | G06Q 10/06 370/261 |
| 2006/0246955 A1 | 11/2006 | Nirhamo et al. | |
| 2007/0156487 A1* | 7/2007 | Sanabria | G06F 9/546 705/7.26 |
| 2007/0203778 A1* | 8/2007 | Lowson | G06Q 10/06 705/7.14 |
| 2008/0229307 A1* | 9/2008 | Maeda | G06F 9/5038 718/100 |
| 2009/0171707 A1* | 7/2009 | Bobak | G06Q 10/06 705/7.23 |
| 2010/0161366 A1 | 6/2010 | Clemens et al. | |
| 2010/0191919 A1 | 7/2010 | Bernstein et al. | |
| 2010/0268568 A1* | 10/2010 | Ochs | G06Q 10/0633 705/7.27 |
| 2011/0276977 A1* | 11/2011 | van Velzen | G06F 9/5038 718/104 |
| 2011/0321033 A1* | 12/2011 | Kelkar | G06F 9/44505 717/174 |
| 2013/0232497 A1* | 9/2013 | Jalagam | G06F 9/5072 718/104 |
| 2014/0165060 A1 | 6/2014 | Muller et al. | |
| 2014/0215049 A1* | 7/2014 | Provaznik | H04L 41/0663 709/224 |
| 2015/0280981 A1 | 10/2015 | Sasada et al. | |
| 2015/0304175 A1* | 10/2015 | Maes | G06F 8/70 709/226 |
| 2015/0370538 A1* | 12/2015 | Wang | G06F 8/34 717/105 |
| 2016/0048388 A1* | 2/2016 | Eksten | G06F 8/70 717/105 |
| 2016/0077919 A1* | 3/2016 | Duggan | G06F 11/1446 714/15 |
| 2016/0205037 A1 | 7/2016 | Gupte et al. | |
| 2016/0234073 A1* | 8/2016 | Maes | H04L 41/12 |
| 2016/0239595 A1* | 8/2016 | Maes | G06F 9/5061 |
| 2016/0285694 A1 | 9/2016 | Maes | |
| 2017/0351504 A1 | 12/2017 | Riedl | |
| 2018/0165069 A1* | 6/2018 | Xie | G06F 8/60 |
| 2018/0165071 A1* | 6/2018 | Raghavan | G06F 8/60 |
| 2018/0165090 A1* | 6/2018 | Raghavan | G06F 8/60 |
| 2018/0165158 A1 | 6/2018 | Raghavan et al. | |
| 2019/0068622 A1* | 2/2019 | Lin | G06F 21/552 |

* cited by examiner ically.

FAILURE HANDLING FOR LIFECYCLE BLUEPRINT WORKFLOWS

BACKGROUND

Virtualization has enabled enterprises to implement computer systems that meet their needs without having to concern themselves with underlying hardware. Tools are available that allow an enterprise to design a system that meets its needs and to automatically implement the design. Templates of predesigned systems can simplify the design process. For instance, an enterprise desiring an e-commerce site can select from a variety of templates suitable for e-commerce sites. Once the template-based design is selected, and, in some cases, customized for the enterprise, it can be implemented. Upon implementation, the resulting system is available for use and management by the enterprise.

DETAILED DESCRIPTION

The present invention is directed toward handling failures that can occur in a workflow designed to create or modify an IT application. After the cause of a failure is addressed and instead of continuing the workflow from the point of failure, a workflow is executed from the beginning. The workflow can be the one that failed or a new one generated based on the post-fix configuration of the IT application. Executing or re-executing from the beginning ensures that the implementation engine remains in sync with the configuration of the IT application.

Herein, an "information-technology blueprint" or, more simply, a "blueprint", is an executable document that can be executed to implement an IT application, such as an e-commerce site, a social-media site, a news site, a crowd-sourced information site, etc. Blueprint components can include basic components and other blueprints. Some blueprint components correspond to application components. For example, an e-commerce blueprint including a load-balancer component can be deployed to create an e-commerce application that includes a load balancer.

Blueprint methods can be "idempotent", that is, they can achieve a requested result from a variety of initial conditions. Idempotent methods may, for example, evaluate the initial conditions and generate a workflow to achieve a requested result based, in part, on the initial conditions. Thus, the same idempotent method used to create an IT application can be used to modify the IT application, e.g., by specifying different attribute values in the modification request. The inclusion of idempotent methods facilitates the creation of "lifecycle" blueprints.

Herein, a "lifecycle" blueprint is a blueprint that applies not only to application deployment, but also to managing the application during post-deployment operation. In addition, lifecycle blueprint can specify the order in which components are removed in order to terminate the application. Managing includes, for example, scaling an application out or in, updating components, and other modifications to the application. Thus, a lifecycle blueprint may maintain an association with, i.e., be dedicated to, an IT application throughout the latter's entire lifecycle.

In some cases, a workflow may fail because one of the tasks included in the workflow fails. Fixing the cause of the failure may cause the automation engine executing the workflow to lose track of the state of the workflow. Accordingly, the present invention provides for re-executing the workflow that previously failed or for generating a new workflow and executing it to fulfill the original request to create or modify an IT application. This allows the lifecycle blueprint to continue to be used for managing and eventually destroying the IT application.

Figure 1:
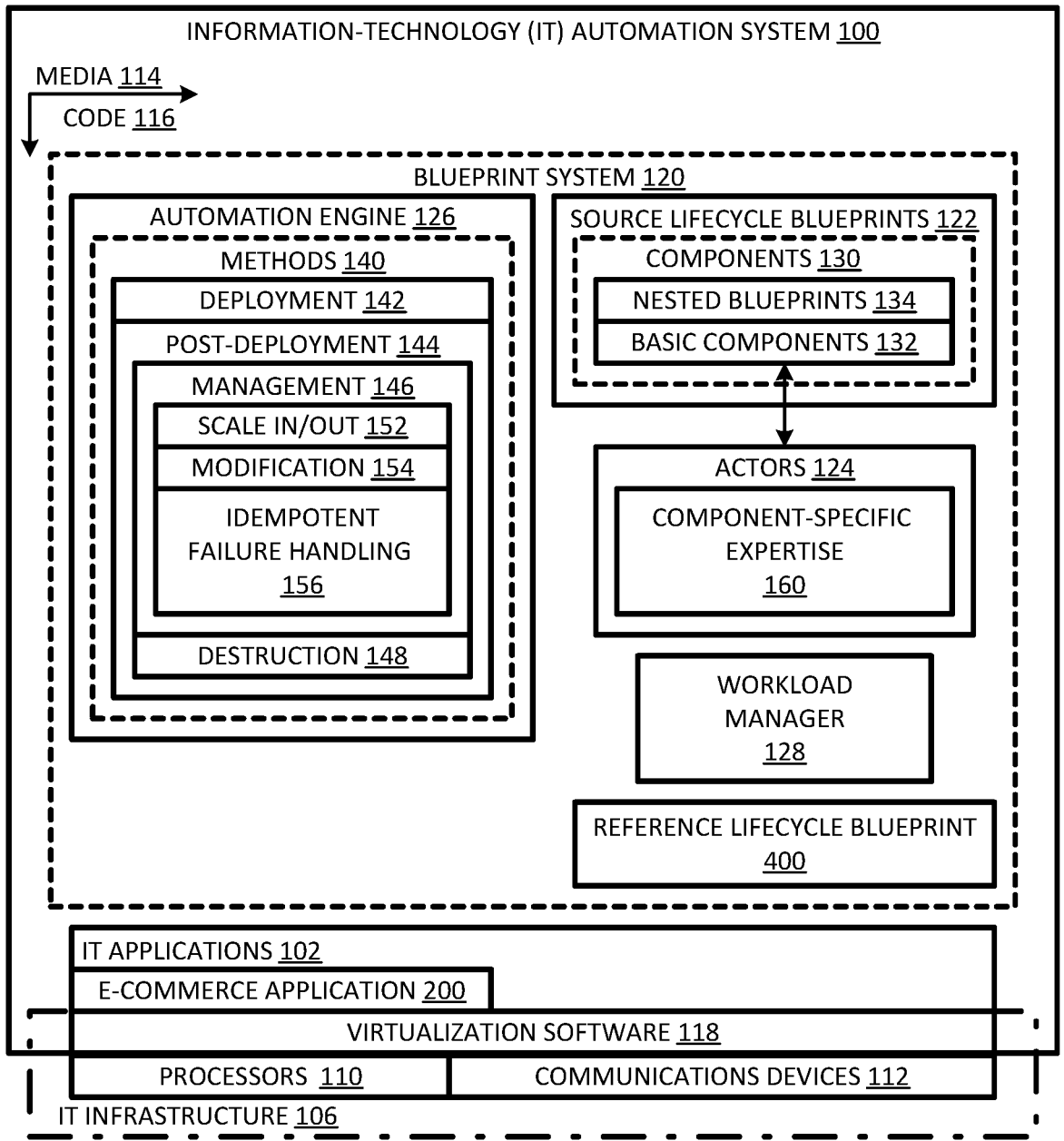
FIG. 1 is a schematic diagram of an information-technology (IT) automation system.

As shown in FIG. 1, an information-technology system 100 provides for lifecycle (creation through destruction) management of IT applications 102. Applications 102 run on an IT infrastructure 106 including hardware, e.g., processors 110, communications devices 112 (including input-output devices) and media 114 (e.g., memory, disks). Non-transitory media 114 is encoded with code 116 representing the software described herein including virtualization software 118 of IT infrastructure 106 and including blueprint system 120.

Blueprint system 120 includes source lifecycle blueprints 122, actors 124, an automation engine 126, and a workload manager 128. Source lifecycle blueprints 122 contain components 130 that serve as building blocks. Two types of blueprint components may be distinguished: basic blueprints 132 and nested blueprints 134. A blueprint may incorporate another ("nested") blueprint as a component. Components that are not blueprints themselves are "basic" components. The expertise required by a basic component can be included in the basic component itself and/or in respective external "actors".

Automation engine 126 provides methods 140 for deploying a blueprint and for managing, and destroying the application resulting from the deployment. Methods 140 include deployment methods 142 and post-deployment methods 144. Post-deployment methods 144 include management methods 146 and destruction methods 148. Management methods 146 including scaling methods 152 for scaling an application in or out, modification methods 154 for modifying an application, and idempotent failure-handling methods 156 for handling application failures.

Idempotent methods are methods that reach the same endpoint from different starting points. Typically, an idempotent method compares a requested configuration (e.g., of a target infrastructure or application) with the current configuration, and then generates and executes a workflow to modify the current configuration to reach the requested configuration.

Figure 4:
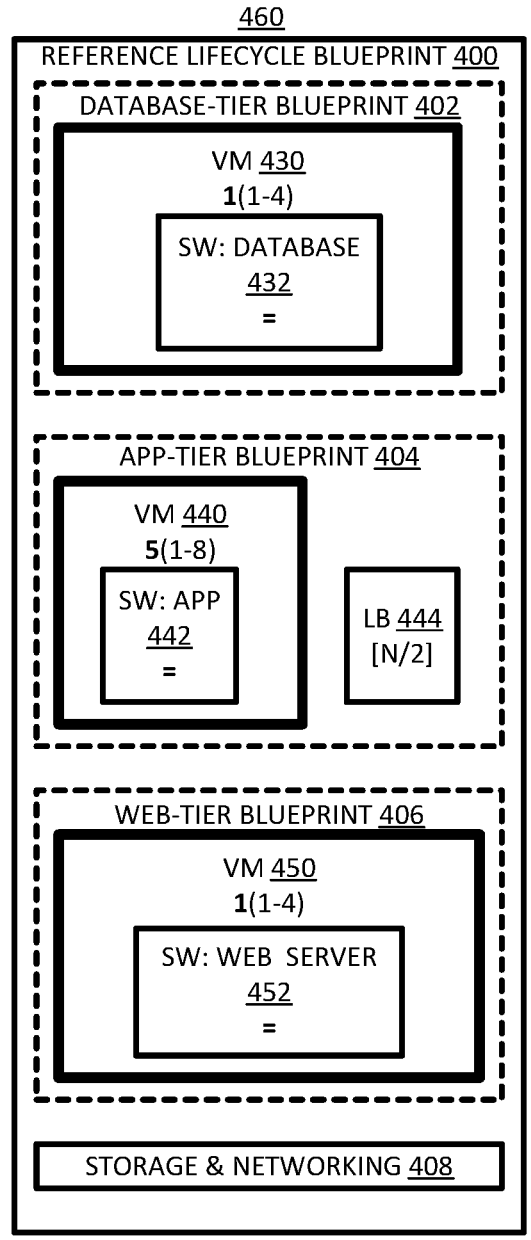
FIG. 4 is a reference lifecycle blueprint used for post-deployment management of the IT application of FIG. 2.

During deployment, a "snapshot" or replica of the original blueprint is made, yielding a "reference" lifecycle blueprint 400, detailed in FIG. 4. The reference blueprint 400 is associated with, i.e., dedicated to, the IT application that results from deployment. Either of the original blueprint and the reference blueprint can be modified without modifying the other. The reference blueprint maybe altered to specify selections where the original blueprint provides a choice. For example, if a source blueprint allows a selection from a range of 1-10 virtual machines, the reference blueprint can add that the user selected five virtual machines without affecting the original blueprint. From one perspective, a reference blueprint can be a customized source blueprint.

The selections made to effect deployment of an IT application may be modified post-deployment. Because the blueprint methods are idempotent, the method used to modify an application can be the same as the method used to deploy the application. Thus, the reference blueprint can be executed to modify the associated IT application. For example, the original selection of five virtual machines can be updated to six virtual machines. When a scale-out request is made to automation engine 126, the associated IT application is modified to include six virtual machines where there were only five before. This scenario is spelled out below.

Figure 2:
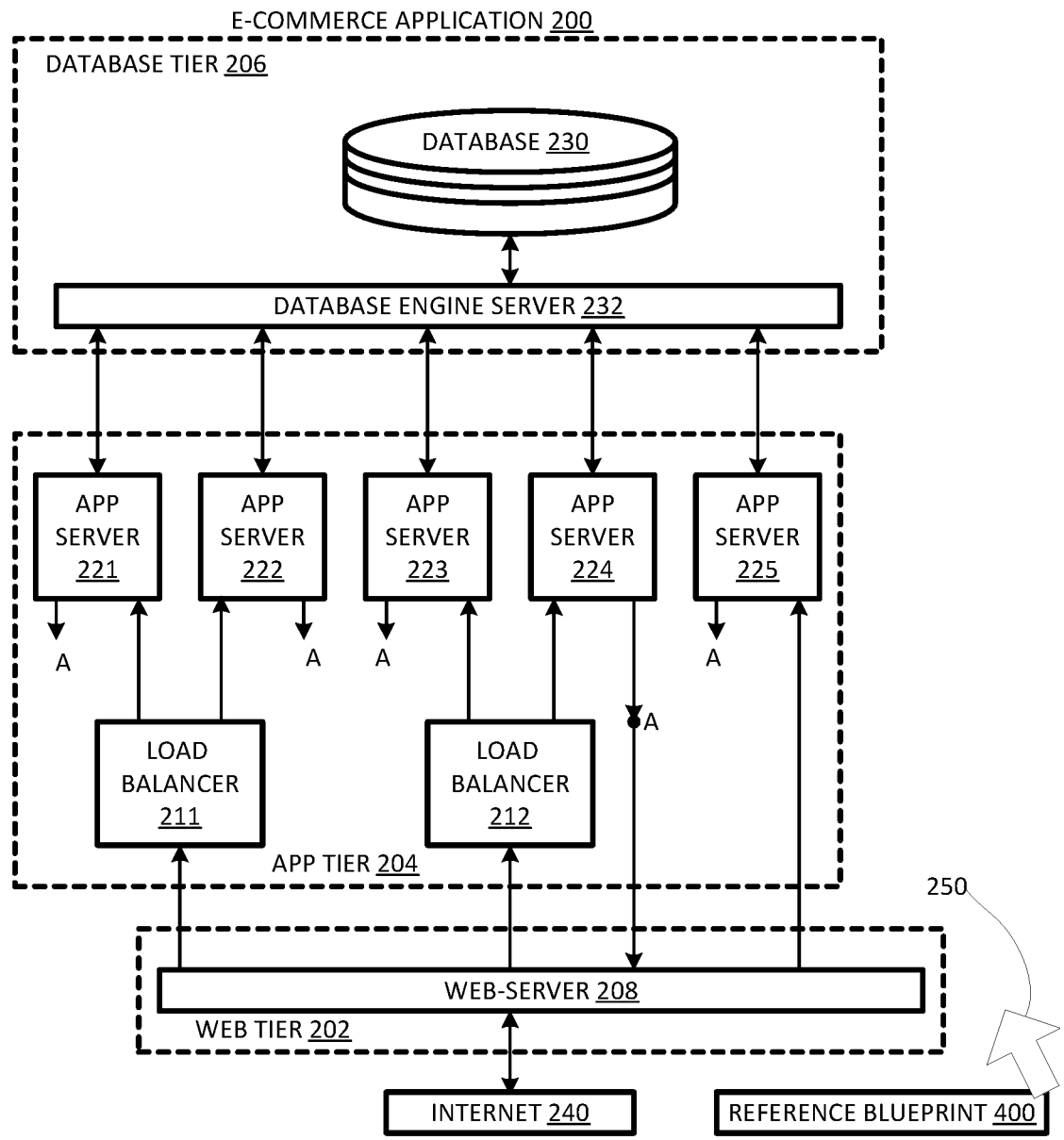
FIG. 2 is a schematic diagram of an e-commerce IT application created and managed by the IT automation system of FIG. 1.

A three-tier e-commerce IT application 200 is shown in FIG. 2 including a web tier 202, an app tier 204, and a database tier 206. Web tier 202 includes a single web server 208, that is, a single virtual machine running web server software. One function of web-server 208 is to receive requests over the Internet and forward them to a single app server or distribute them among plural app servers, that is, virtual machines that execute e-commerce apps.

In the case app tier 204 includes plural functionally identical app servers, web server 208 could, in principle, distribute the transactions evenly among the plural app servers. However, transactions can vary considerably in complexity such that a first app server may handle a single complex transaction in the time a second server handles many simple transactions. If the first server receives a series of complex transactions, it may become a bottleneck and appear slower than desired to a client/user. A load balancer can detect when an app server is backing up and preferentially forward requests to another app server until the backup is cleared.

Figure 5:
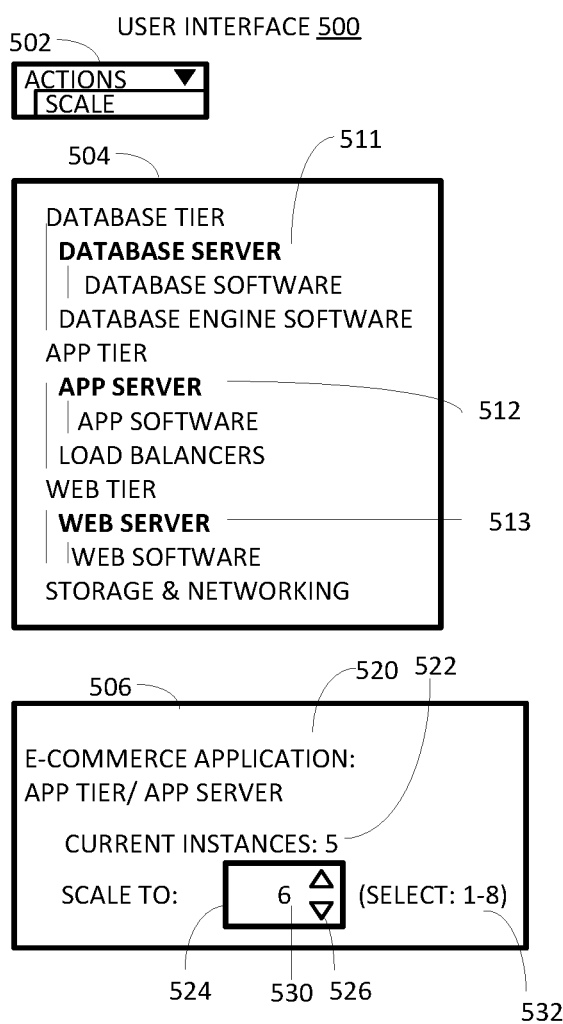
FIG. 5 is a directory-tree topological user interface for modifying the reference blueprint of FIG. 4.

If a five-way load balancer were available, it might be used in app tier 204 given the five app servers as in FIG. 5. However, in this expository example, only two-way load balancers are available. Two load balancers 211 and 212 are used to service two app servers 221 and 222, and 223 and 224 each. The remaining app server 225 is fed directly by web server 208.

Some, but not necessarily all, transactions may require a query to a database 230 via a database engine running on a database engine server 232 of database tier 206. Accordingly, each app server 221-225 is arranged to communicate with database engine server 232. The database engine formulates queries into a form understood by database 230. The responses may be reformatted for consumption by an app server, and forwarded to the app server that presented the respective query. Responses are processed and packaged by the respective app server and forwarded to the client/user via web server 208 (via node A, as represented in FIG. 2) and the Internet 240.

As shown in FIG. 2, reference blueprint 400 is dedicated to (e.g., as indicated by arrow 250) e-commerce application 200. Reference blueprint 400 has been provisioned to realize e-commerce application 200. Post deployment, reference blueprint 400 is used to modify, e.g., scale out, e-commerce application 200.

To this end, a value, e.g., a number of app servers, previously applied to e-commerce application 200 is changed in reference blueprint 400, and then reference blueprint 400 is executed to implement the corresponding change in e-commerce application 200. In this way, reference blueprint 400 remains "coherent" or in "synchronization" with e-commerce application 200 and can be used, e.g., by automation engine 126, (FIG. 1) as a description of the current configuration of e-commerce application 200.

Figure 3:
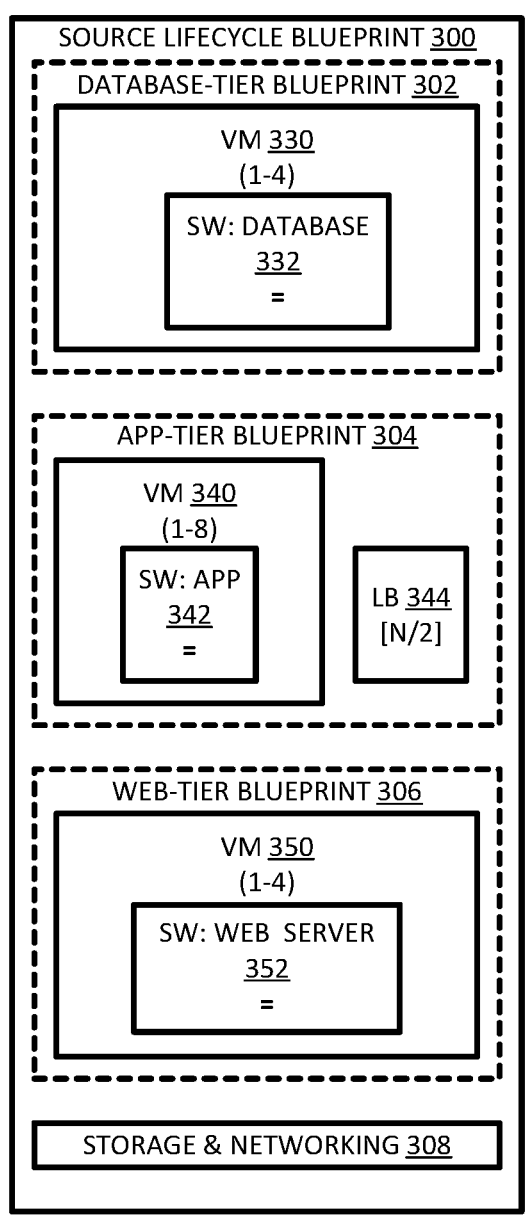
FIG. 3 is a source lifecycle blueprint used to deploy the IT application of FIG. 2.
Figure 3:

As shown in FIG. 3, a source lifecycle blueprint 300 used to deploy e-commerce application 200 (FIG. 2), includes a database-tier blueprint 302, an app-tier blueprint 304, a web-tier blueprint 306, and storage and networking components 308, and idempotent methods 310. Associated with source lifecycle blueprint 300 are actors 320, which include expertise, e.g., embodied in methods, required for deploying basic components of source lifecycle blueprint 300. The actors include a load-balancer actor 322, a web-software actor 324 (e.g., with installation instructions), an app-software actor 326, and a database-software actor 328.

Database-tier blueprint 302 includes a virtual-machine blueprint 330 and a database-software basic component 332. Database-tier blueprint 302 specifies a range of 1-4 virtual machines to be used as database servers, with the exact number to be selected, e.g., as part of a deployment request. Database-tier blueprint 302 further specifies, with respect to database-software component 332, that the number of software installations is equal to the (to-be determined) selected number of database servers.

App-tier blueprint 304 includes a virtual-machine blueprint 340, an app software basic component 342, and load balancer basic component 344. App-tier blueprint 304 allows a selection from a range of 1-8 virtual machines. App-tier blueprint 304 specifies that the number of instances of app-server software is to be equal (=) to the number of virtual-machine blueprint instances in blueprint 304. App-tier blueprint 304 specifies that the number of load balancers is to be equal to some function, e.g., [N/2], i.e., the characteristic (non-fractional) part of N/2, where N is the number of virtual machines in blueprint 304.

Web-tier blueprint 306 includes a virtual machine blueprint 350 and a web server software basic component 352. Web-tier blueprint 306 specifies a range of 1-4 virtual machines, from which a value can be selected for deployment. Web-tier blueprint 306 further specifies that the number of web-software installations is to be equal to the number of virtual machines deployed.

Reference lifecycle blueprint 400, shown in FIG. 4, is created by taking a snapshot of source lifecycle blueprint 300 or a substitute blueprint. Therefore, at least initially, reference lifecycle blueprint 400 has instances of the same components in the same arrangement as source lifecycle blueprint 300. Management policies may cause the reference blueprint to diverge from the source blueprint. At the very least, choices required for deployment are made in the reference blueprint prior to provisioning. For example, in FIG. 4, numbers of virtual machines have been selected for respective tiers.

Reference lifecycle blueprint 400 includes: a database-tier blueprint component 402, with a virtual-machine blueprint component 430 and a database-software basic component 432; an app-tier blueprint component 404 with a virtual-machine blueprint 440, an app-server software basic component 442, and a load-balancer basic component 444; and a web-tier blueprint component with a virtual-machine blueprint component 450 and a web-server software component 452. In addition, reference lifecycle blueprint 400 includes storage and network components 408.

As illustrated, reference lifecycle blueprint 400 indicates that "1" is the number of virtual-machine instances selected from the original range of 1-4 virtual machines specified for the database tier; "5" is the number of virtual-machine instances selected for the app tier, and "1" is the number of virtual-machine instances selected for the web tier. Respectively equal numbers of software installations are to be selected for the tiers. The number of load balancers for the app tier is calculated to be [5/2]=2.

As indicated above, reference lifecycle blueprint 400 may be a snapshot of a "substitute" source lifecycle blueprint. For example, upon a deployment request, the deployment engine may look for an updated version of the requested blueprint and, if found, substitute it for the original blueprint. In such a case, the snapshot is taken of the updated version. Selected values are then indicated by the reference blueprint 400 as shown in FIG. 4.

From another perspective, FIG. 4 can serve as a user interface element 460. In FIG. 4 the components are arranged as a nested topological representation of a blueprint. The components (430, 440, and 450) that specify a range are highlighted (by a thick boundary to indicate they may be selected, e.g., for scaling out or in. Other blueprint components are relatively dim to indicate that they cannot be selected for scaling or for whatever the selected action is. By "topological" is meant that the graphical relationships among representations (of blueprint components) correspond to the relations among the blueprint components represented.

Alternatively, a directory-tree topological user interface 500, shown in FIG. 5, can include a drop-down menu 502 for selecting a modification action to be performed on an application, a directory tree representation 504 of the reference blueprint for the application, and a dialogue box 506. An action such as scaling, updating a (software) component, or adding a component can be selected. The components 511-513 to which the action may be applied are highlighted (e.g., bolded) in the directory tree. Selecting (e.g., clicking on) a highlighted component representation in the tree calls a dialogue box, e.g., dialog box 506. The un-highlighted items cannot be selected or activated to yield a dialog box.

Figure 6:
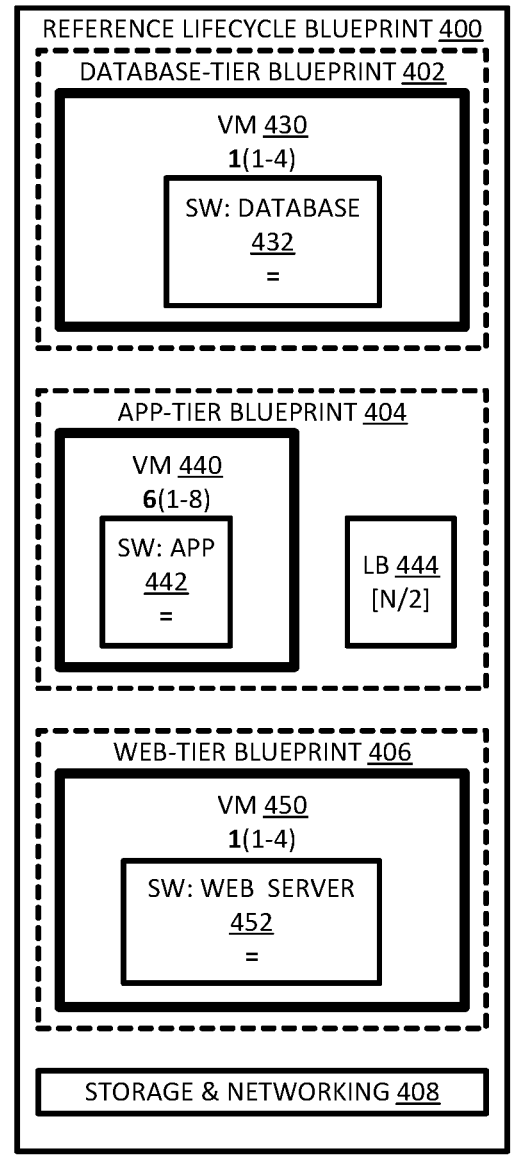
FIG. 6 is the reference lifecycle blueprint of FIG. 4 after modification using the user interface of FIG. 5.

Dialogue box 506 identifies the directory path name 520 for the selected component. The quantity 522 of current instances, in this case "5", is indicated. A numeric selection box 524 has up and down arrows 526 that can be used to increase or decrease the number of current instances. In the illustrated scenario, the up arrow has been clicked so that the "scale to" value 530 now equals "6". Entering the change modifies reference lifecycle blueprint 400, with the result indicated in FIG. 6, in which the number of current instances is "6" rather than "5".

Figure 7:
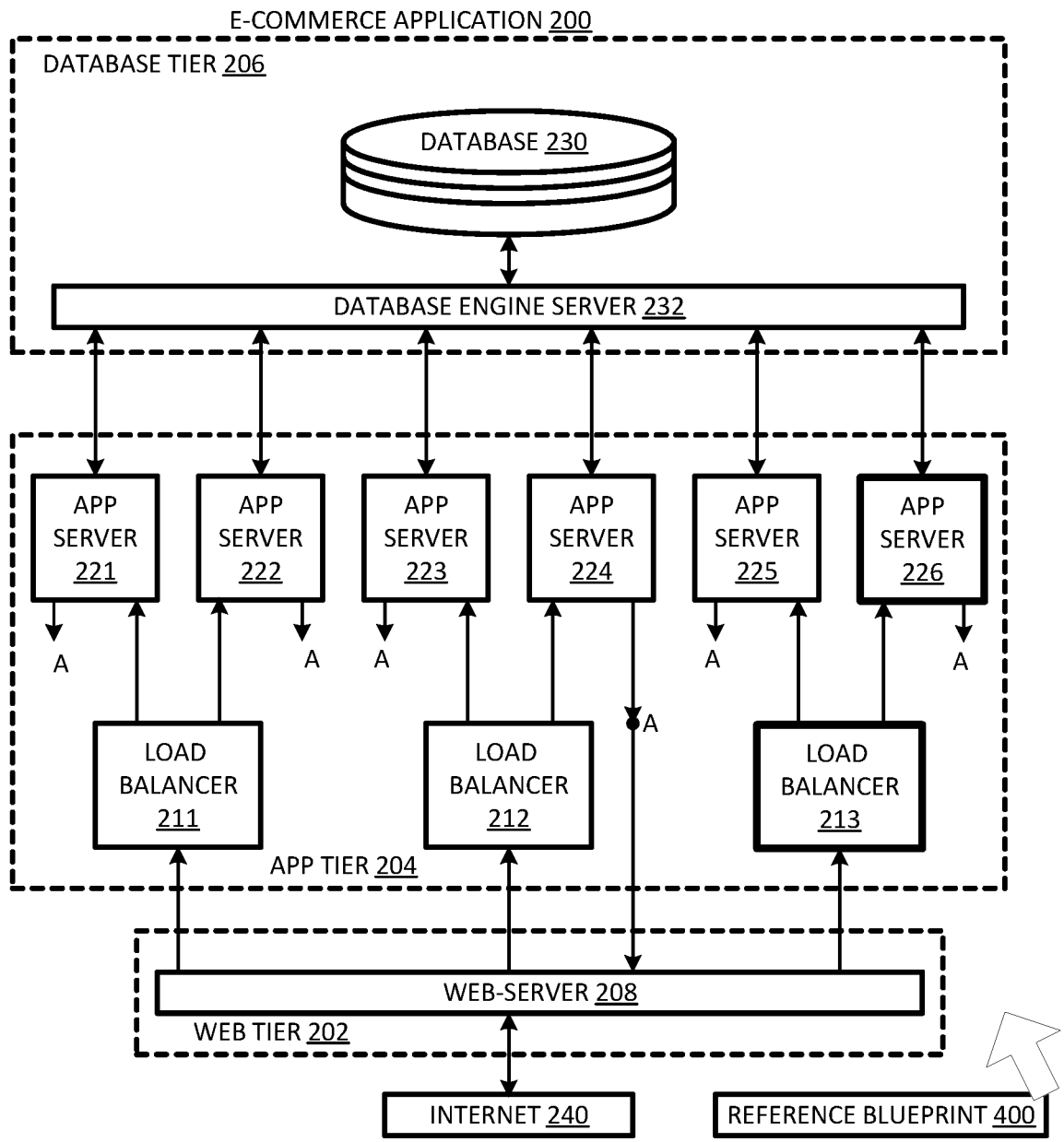
FIG. 7 is the IT application of FIG. 2 after modification resulting from deployment of the reference lifecycle blueprint of FIG. 6.

When the scale-out request is executed, a sixth app server 226 is created in app tier 204 and added to e-commerce application 200, as shown in FIG. 7. Since there are then six app servers, the formula [N/2] for load balancers requires three load balancers instead of two. Therefore, a third load balancer 213 is created and added to app tier 204. App server software is then installed on the added virtual machine. Internet protocol (IP) addresses are then assigned to the new server and the new load balancer. The new load balancer is informed of the IP addresses of the app servers it services, and web server 208 is informed of the IP address for the third load balancer 213.

Figure 8A:
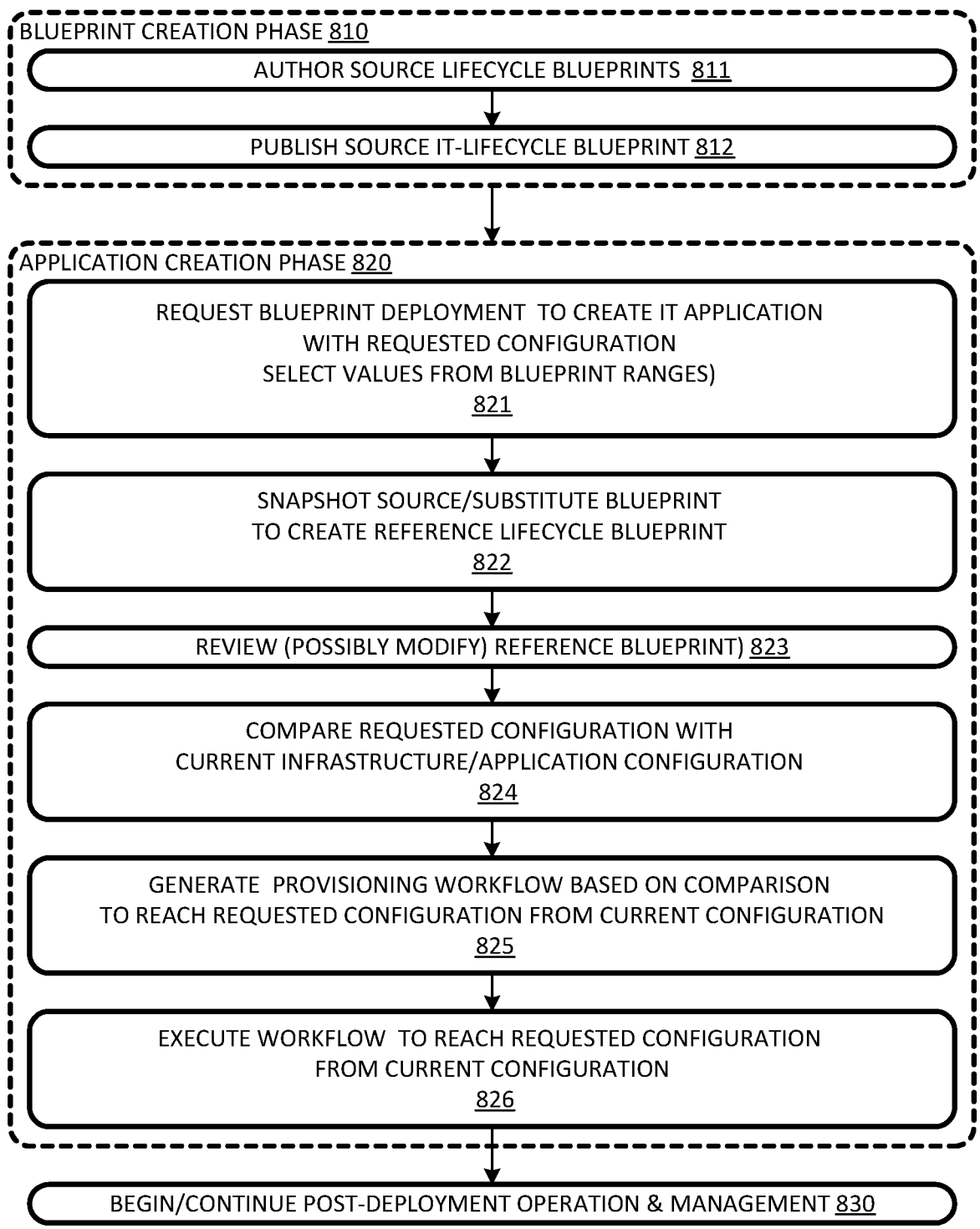
FIGS. 8A and 8B constitute a flow chart of an IT application lifecycle process applicable to the IT applications of FIG. 1 and other IT applications.
Figure 8B:
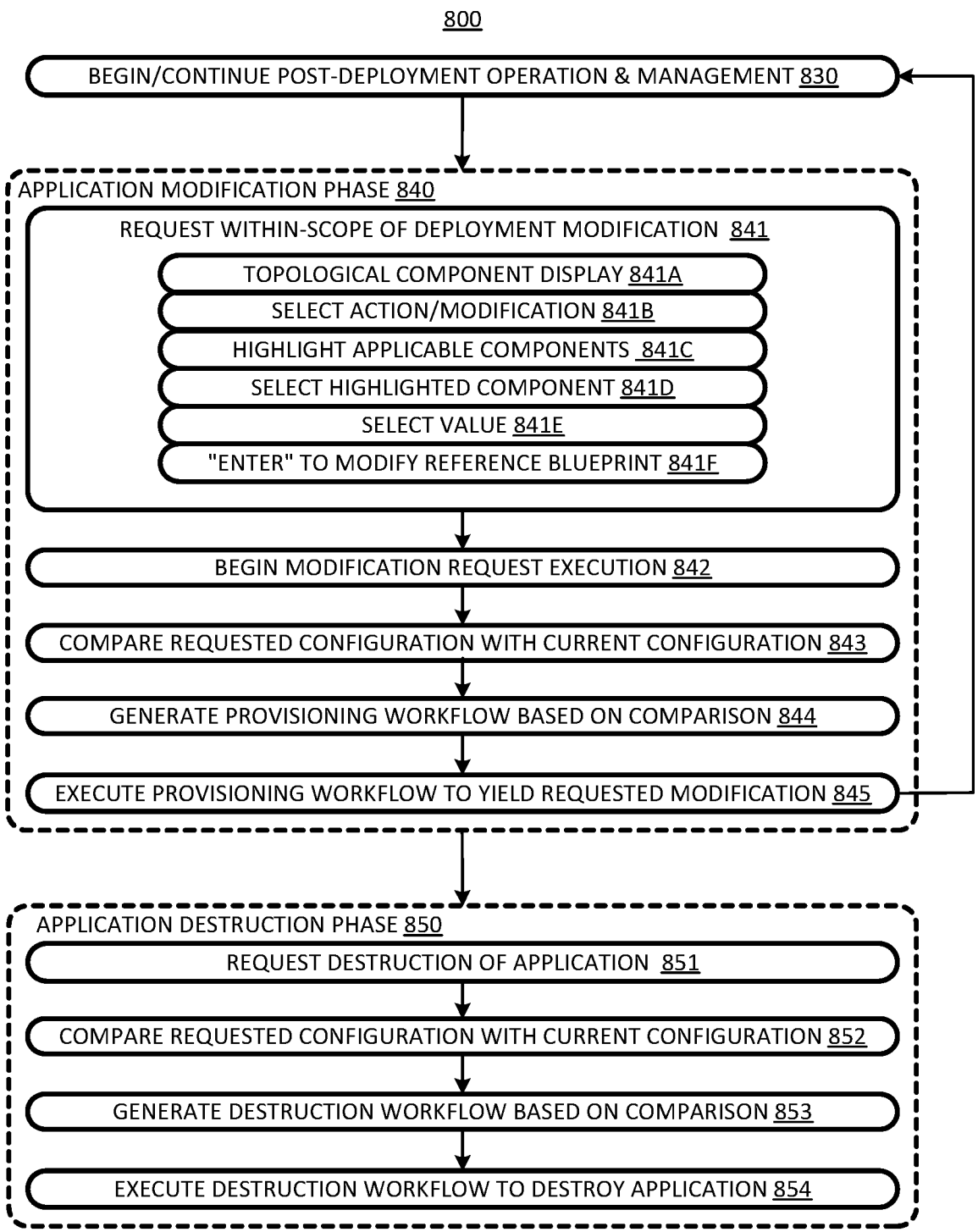

A lifecycle blueprint process 800, flow charted in FIGS. 8A and 8B, can be implemented in IT automation system 100 (FIG. 1) and other systems. A blueprint creation phase 810 begins, at 811, with authoring a source IT-lifecycle blueprint. The blueprint also includes components, e.g., basic components and blueprint components. Components may have further expertise embodied in actors that are external to the blueprint. At 812, the source IT-application blueprint is published. This means it is available for deployment in a production setting.

An application creation phase 820 begins, at 821, with a request to deploy a blueprint to create an IT application with a requested configuration. To that end, the request may specify values selected from ranges allowed by the blueprint. Alternatively, some or all of those values can be specified during deployment. The request can be made by a human user or by an automated entity, e.g., in accordance with some management policy.

At 822, a reference lifecycle blueprint is created. In most cases, the reference blueprint is created by taking a snapshot of the source blueprint so that the reference blueprint is a replica of the source blueprint. However, in some cases, a blueprint is substituted for the source blueprint and the snapshot is taken of the substitute. The substitute can be derived by copying and modifying the source blueprint. For example, the deployment process may check to see if there are any updates available for the requested blueprint. If there is an update, the updated version may be the substitute and serve as the subject of the snapshot used to create the reference blueprint. In any case, the source and reference blueprints may be modified independently of each other, so they can diverge from each other. At 823, the reference lifecycle blueprint is reviewed for compliance with management and other policies. This review can include automated and human-participation approval procedures, and may result in a rejection of the deployment request, approval without modification, or approval with modification.

At 824, the blueprint method compares the requested configuration with the current infrastructure/application configuration. For example, the target virtual infrastructure may not be hosting any IT components, or there may be some remnants from a previous failure to create an IT application at the infrastructure. At 825, a provisioning workflow is generated based on the comparison and designed to reach the requested application configuration from the current configuration. At 826, the provisioning workflow is executed to establish the application in the requested configuration. This completes application creation phase 820. At 830, post-deployment operation and management are begun and continued.

Once an application is in operation, it may be modified in an application modification phase 840, shown in FIG. 8B. At 841, a request is made and received for a within-scope-of-deployment blueprint modification. Blueprints that offer a selection of values for one or more parameters can be said to offer a range of application deployment configurations based on the values selected, e.g., in the request. Once the application is deployed, there may be a reason to change some of the value selections. In the example presented in FIGS. 4-7, a range is 1-8 and the modification was from 5 to 6 (app servers). The reference blueprint could have deployed 6 servers originally if that value had been selected in the original deployment request. So the modification from 5 to 6 is within the deployable scope of the reference blueprint. On the other hand, selecting a modification from 5 to 9 would not be within the allowed blueprint range of 1-8.

Action 841 can be implemented as indicated in FIG. 8B. At 841A, a blueprint is displayed topologically, e.g., as in either FIG. 4 or FIG. 5. At 841B, the desired action or modification is selected. For example, a scale-in or scale-out action may be selected. At 841C, the components to which the action/modification is applicable are highlighted relative to components to which the action/modification is not applicable. For example, thicker lines, bolding, colors, etc., can be used to highlight in a representation of the reference blueprint, which may also be a representation of the application's current state. If a new action is selected, thereby repeating action 841B, then action 841C is repeated so that the components that the new action can apply to are highlighted and those to which the new action does not apply are not or no longer highlighted.

At 841D, one of the highlighted components is selected. In this case, the current value of a parameter relating to the selected action/modification is presented. At 841E, the new value is selected, e.g., by manipulating value controls or by overwriting the old value. At 841F, the new value may be "entered" so that the reference blueprint is modified to include the new value. This process is explained above with reference to FIG. 5.

At 842, execution of the modification request is begun. At 843, the requested configuration is compared with the current configuration. At 844, based on the comparison, a workflow is generated designed to convert the current configuration to the requested configuration. At 845, the workflow is executed so that the application matches the configuration expressed by the modified reference lifecycle blueprint. The application modification phase is thus complete. However, process 800 provides for looping back to post-deployment operation 830, allowing for further modifications by iterating application modification phase 840.

At some point, the application may no longer be required. Thus, an application destruction phase 850 begins, at 851, with a request to destroy the application. At 852, the desired application-free infrastructure configuration is compared to the current application configuration. At 853, based on the comparison, a destruction workflow is generated. At 854, the destruction workflow is executed to destroy the application. This completes destruction phase 850 and lifecycle process 800.

For example, one task can be to create a virtual machine, and another task can be to install a particular software app on the virtual machine. Clearly, the virtual machine should be created before the software is installed on it. Also, the virtual machine should be created before an IP (Internet Protocol) address can be assigned to it. Only after the address is assigned, can other components be informed of the assignment so that they can communicate with the new combination of virtual machine and app software. Various dependencies must also be considered when destroying components, as may occur in a scaling-in modification or destruction of an application. IP addresses may be de-assigned, property-bound values may be unbound, and hosted components destroyed or removed before their hosts are removed.

Thus, the workflow for creating or modifying a complex IT application can include a large number of tasks, many of which rely on other tasks to have been completed for their own execution. A failure of one task can impact many others that follow it in the workflow. The challenge is to figure out how to handle a failed workflow task in the context of an IT system that uses lifecycle blueprints.

Figure 9:
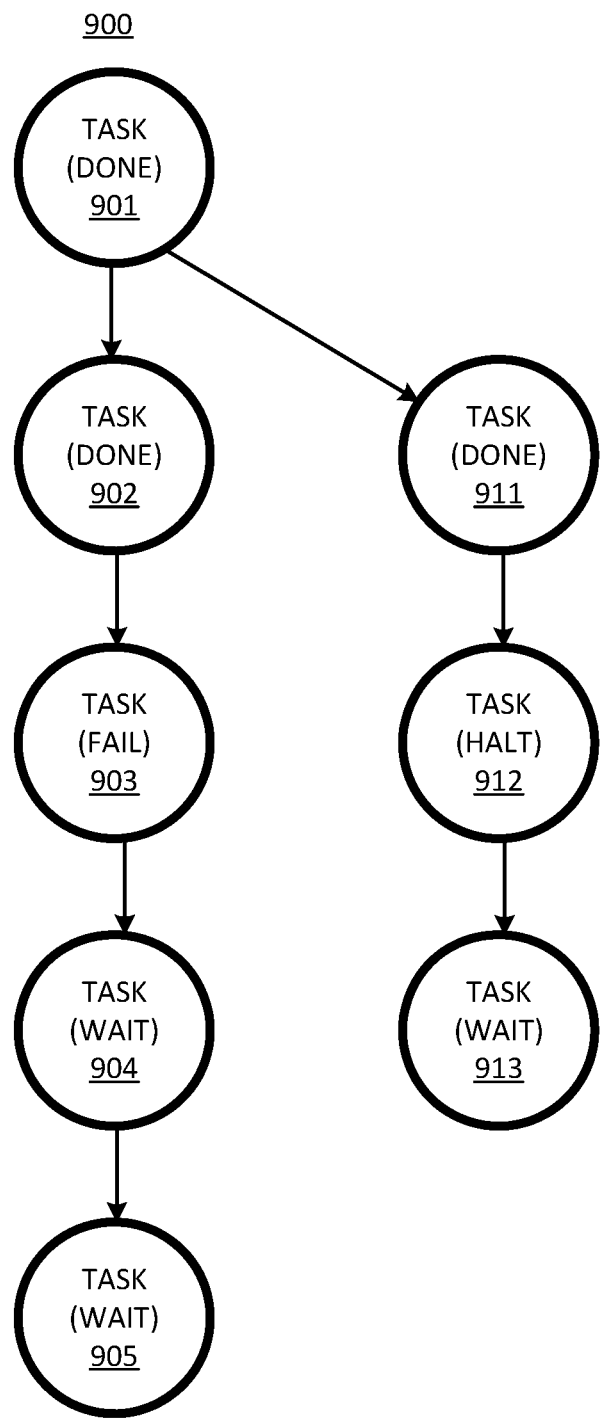
FIG. 9 is a schematic illustration of a provisioning workflow generated by methods of the reference lifecycle blueprint of FIG. 6.

A workflow 900, simplified for expository purposes, is shown in FIG. 9 including tasks 901-905 and, in a branch, tasks 911-913. At the time represented in FIG. 9, workflow 900 has been generated and execution has begun. Tasks 901, 902, and 911 have been completed and so are "done". Execution of task 913 was begun, but execution failed. Accordingly, tasks 904 and 905 are still waiting for execution. Depending on the embodiment, execution in a branch may be halted, as shown for task 912, once a failure is detected in another branch. In that case, subsequent tasks, e.g., task 913, may remain in a wait state until the halted task is executed. Alternatively, execution of tasks in an unfailed branch may continue until the branch is completely executed. In that alternative, tasks 912 and 913 would complete execution.

There are many possible causes for a failure. There may be a hardware or software problem with the infrastructure, a problem with compatibility of apps used in the IT application or used as tools by the workflow, problems in the workflow itself, e.g., due to a defect in the blueprint used to generate the workflow, or a problem with the automation engine used to execute the workflow. In general, it is assumed that the IT system cannot self-correct the failure, so the "fix" must be performed outside of the automation system. Thus, once the problem that caused the failure is fixed, the state of the workflow will no longer be coherent with the automation engine executing the workflow. Therefore, it may not be possible or it might be problematic to resume execution of the workflow once the problem is fixed.

Accordingly, the present invention calls for executing a workflow from the beginning after a failure is detected and fixed. In a "same workflow" variation, the same workflow that encountered the failure is re-executed from the beginning. In a "new workflow" variation, a new workflow is generated and then executed from the beginning. These variations are discussed below with reference to FIG. 10, which, in the context of the creation of an IT application, can be seen as providing additional detail for process 800, e.g., actions 824-826, 843-845, and 852-854.

Figure 10:
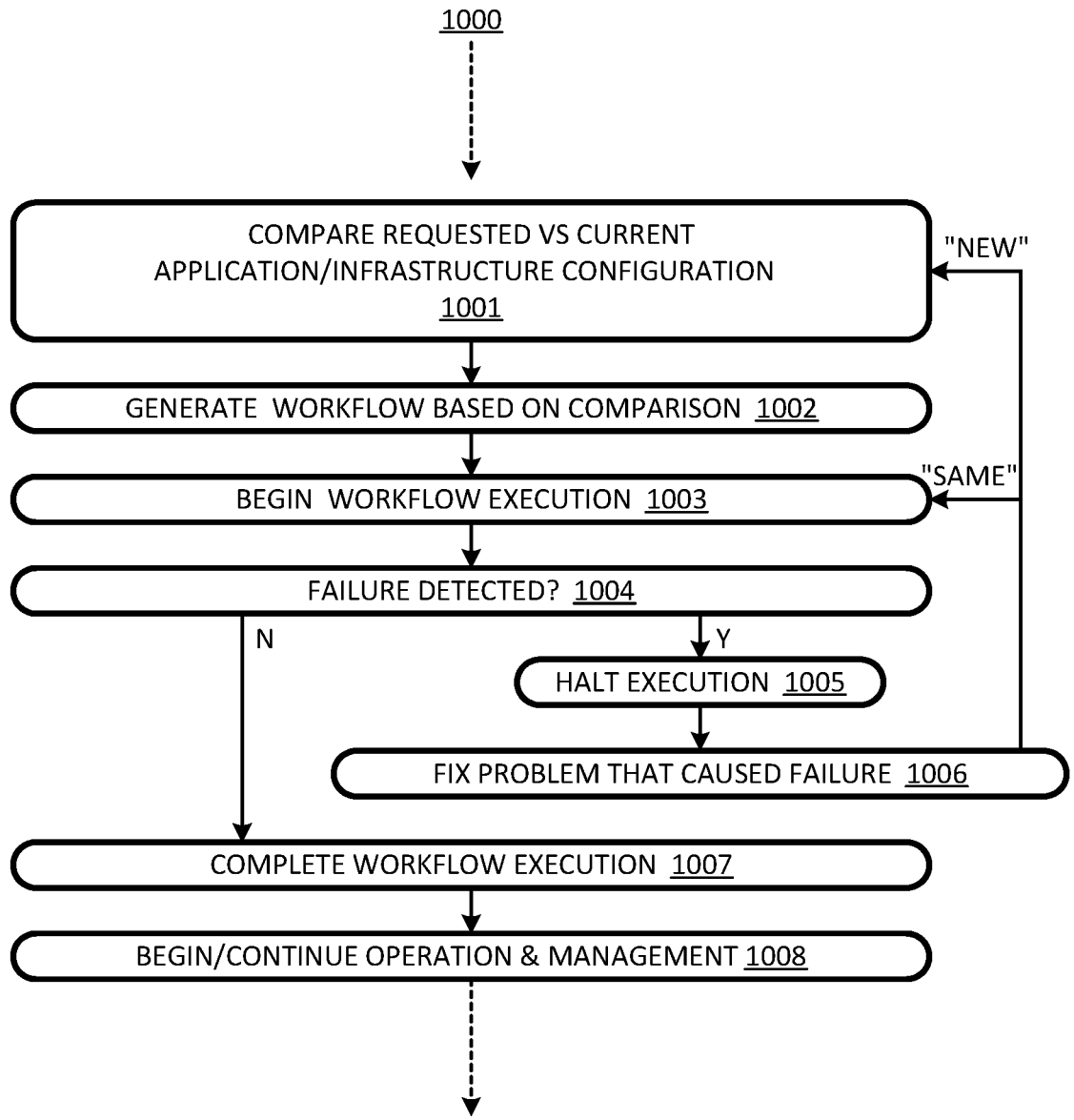
FIG. 10 is a flow chart of a process for addressing a failure in the provisioning workflow of FIG. 9.

In process 1000, flow-charted in FIG. 10, the requested and current configurations of the application (if deployed) and the infrastructure are compared at 1001. Based on the comparison, a workflow is generated at 1002; the workflow is designed to meet a request to create or modify an IT application given the current state of the IT application and/or the supporting (real or virtual) infrastructure. At 1003, execution of the workflow is begun. At 1004, a determination is made whether a failure is detected. If so, execution is halted at 1005, at least in the branch including the task associated with the failure. Depending on the variation, tasks in other branches may or may not be halted as well.

At 1006, the problem that caused the failure is identified and fixed. This "fix" is offline from the point of view of the automation engine executing the workflow. Prior to the failure, the automation engine remains "coherent" or "in sync" with the workflow so that it can manage the workflow. However, the fix breaks this coherence as the workflow enters a state that is not known to the automation engine.

Accordingly, in the "same workflow" variation, process 1000 returns to 1003 to re-execute the workflow in which the failure occurred. During this re-execution, tasks that were completed before the failure can be recognized as completed (done). Thus, they are simply marked as "done", without otherwise being executed. For example, in the scenario task 902 results in the creation of a virtual machine in the first run of workflow 900, then, given that the virtual machine is still extent, task 902 will be marked as "done" almost immediately after it is begun. Re-execution of task 902 does not result in the creation of another virtual machine.

Upon re-execution, when previously failed task 903 is reached, it will be executed in its entirety or it will simply be marked "done", depending on whether the fix resulted in an accomplishment of what task 903 was intended to accomplish. In either case, the automation engine maintains coherence with the workflow. In due course, tasks 904, 905, 912, and 913 are executed to complete workflow 900 at 1007. At 1008, operation and management of the IT application can begin (if it was just created) or continue (if it was modified).

In the "new workflow" variation, process 1000 returns to 1001, checking the application/infrastructure configuration at 1001 instead of returning to begin workflow execution 1003. The initial run through 1001-1004 is the same for both variations. The second iteration of 1001 will, in general, encounter a different application state than the first iteration encountered. This is due to changes that were implemented by completed tasks, e.g., 901, 902, 911, as well as any changes resulting from the fix at 1006. Accordingly, the workflow generated in the second iteration of 1002 will, in general, be different from the workflow, e.g., 900, generated in the first iteration of 1002.

Figure 11:
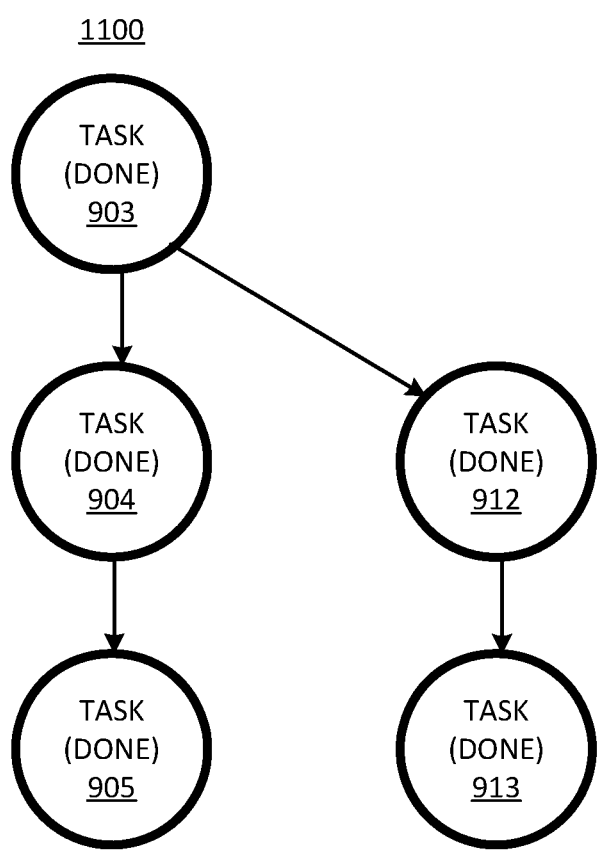
FIG. 11 is a schematic illustration of a provisioning workflow that is executed after the failure of the workflow of FIG. 9.

For example, the second iteration of 1002 could result in the workflow 1100 of FIG. 11; in FIG. 11, new workflow 1100 is shown completed. In this scenario, the tasks left to workflow 1100 are those not completed due to the failure in workflow 900 of FIG. 9. However, in other scenarios, there may be no direct correspondence between the tasks of the failed workflow and the one that replaces it. Also, even if there is a correspondence, there can be scenarios in which the "fix" obviates the need for task 903, which would thus not appear in the new workflow. In this "new workflow" variation, in the illustrated scenario, no failure is detected in the second iteration of 1004. In that case, workflow execution is completed at 1007, and operation and management of the IT application can begin or continue at 1008.

In both the "same workflow" and the "new workflow" variations, execution of a workflow proceeds uninterrupted from beginning to end so that the automation engine that executes the workflows remains coherent with the application state. Thus the blueprint dedicated to the IT application can continue to be used to manage and eventually destroy the IT application.

A "lifecycle blueprint" is a blueprint that can be used to create, modify, and destroy an IT application. Herein, "derive" as applied to blueprints means obtain by copying and modifying one or more other blueprints. "Scaling" herein refers to changing the number of instances of a component in an IT application. "Scaling-out" means increasing the number; "scaling-in" means decreasing the number. The terms "parent" and "child" are defined relative to each other; a parent (application or blueprint) component includes a respective child component, or a child component somehow, e.g., through property binding, depends on a respective parent component.

A lifecycle blueprint can be "assigned" or "dedicated" to an IT application if it is used to manage/modify the IT application. Thus, in FIGS. 2 and 7, reference lifecycle blueprint 400 is dedicated to IT application 200. Typically, reference lifecycle blueprints are dedicated, and source lifecycle blueprints are not dedicated to a specific IT application. Typically, at most one lifecycle blueprint is dedicated to an IT application at any given time.

The automation engines herein provide for "idempotent" methods, that is, methods that reach the same result despite different initial conditions. Idempotency allows methods used to create an IT application to also be used to modify the IT application. Idempotency may involve comparing a requested configuration of a target infrastructure with its current configuration and then generating a workflow designed to modify the current configuration to attain the requested configuration. The configuration of the target infrastructure is typically the configuration of the IT application, if any, executing on the target infrastructure.

Herein, art labeled "prior art", if any, is admitted prior art; art not labelled prior art, if any, is not admitted prior art. The illustrated and other embodiments, as well as variations upon and modifications thereto, are provided for by the present invention, the scope of which is defined by the following claims.

What we claim is:

1. A process comprising:
   in response to a request to create or modify an information-technology (IT) application, executing a method of a lifecycle blueprint to generate a first provisioning workflow based in part on the application state of the IT application, the first provisioning workflow including an ordered arrangement of a first set of tasks;
   beginning a first execution of the first provisioning workflow;
   in response to a detection of a failure of execution of a first task of the first set of tasks, halting the first execution of the first provisioning workflow;
   after a problem that caused the failure to be fixed, beginning a second execution of the first provisioning workflow from its beginning or beginning a first execution of a second provisioning workflow from its beginning; and
   completing the second execution of the first provisioning workflow or the first execution of the second provisioning workflow to complete the requested creation or modification of the IT application, and wherein, during the first execution of the first provisioning workflow, execution of a second task results in the creation or modification of a component of the IT application, and, during the second execution of the first provisioning workflow, execution of the second task does not result in the creation or modification of a component of the IT application.

2. The process of claim 1 further comprising a first application configuration with a requested application configuration, wherein the executing the method to generate the first provisioning workflow is based in part on a comparison.

3. The process of claim 1 wherein the second execution of the first provisioning workflow includes executing the first task so as to create or modify an IT application component.

4. The process of claim 1 further comprising, prior to beginning execution the first execution of the second provisioning workflow and after the failure:
   comparing a second configuration of the IT application with a requested application configuration; and
   executing the method so as to generate the second provisioning workflow based in part on the second application state of the IT application.

5. The process of claim 1 wherein the first provisioning workflow and the second provisioning workflow are designed to reach the same result despite starting from different application states.

6. A system comprising non-transitory media encoded with code that, when executed using hardware, implements a process including:
- in response to a request to create or modify an information-technology (IT) application, executing a method of a lifecycle blueprint to generate a first provisioning workflow based in part on the application state of the IT application, the first provisioning workflow including an ordered arrangement of a first set of tasks;
- beginning a first execution of the first provisioning workflow;
- in response to a detection of a failure of execution of a first task of the first set of tasks, halting the first execution of the first provisioning workflow;
- after a problem that caused the failure to be fixed, beginning a second execution of the first provisioning workflow from its beginning or beginning a first execution of a second provisioning workflow from its beginning; and
- completing the second execution of the first provisioning workflow or the first execution of the second provisioning workflow to complete the requested creation or modification of the IT application, wherein, during the first execution of the first provisioning workflow, execution of a second task results in the creation or modification of a component of the IT application, and, during the second execution of the first provisioning workflow, execution of the second task does not result in the creation or modification of a component of the IT application.

7. The system of claim 6 wherein the process further includes a first application configuration with a requested application configuration, wherein the executing the method to generate the first provisioning workflow is based in part on a comparison.

8. The system of claim 6 wherein the second execution of the first provisioning workflow includes executing the first task so as to create or modify an IT application component.

9. The system of claim 6 wherein the process further includes, prior to beginning execution the first execution of the second provisioning workflow and after the failure:
- comparing a second configuration of the IT application with a requested application configuration; and
- executing the method so as to generate the second provisioning workflow based in part on the second application state of the IT application.

10. The system of claim 6 wherein the first provisioning workflow and the second provisioning workflow are designed to reach the same result despite starting from different application states.

11. The system of claim 6 further comprising the hardware.

* * * * *